United States Patent [19]
Blank

[11] 3,989,966
[45] Nov. 2, 1976

[54] APPARATUS FOR CIRCULATING COOLING AND LUBRICATING LIQUIDS AND THE LIKE PARTICULARLY AFTER SHUTDOWN OF THE APPARATUS

[75] Inventor: Wilhelm Blank, Speichersdorf, Germany

[73] Assignee: Klein, Schanzlin & Becker Aktiengesellschaft, Frankenthal, Germany

[22] Filed: Mar. 25, 1974

[21] Appl. No.: 454,295

[30] Foreign Application Priority Data
Mar. 27, 1973   Germany............................ 2315191

[52] U.S. Cl. ............................... 310/68 C; 310/63; 310/78
[51] Int. Cl.² ...................................... H02K 11/00
[58] Field of Search .................. 310/52, 53, 54, 55, 310/56, 57, 58, 64, 85, 86, 87, 44, 63, 68 C, 78; 415/178; 417/366–371; 184/6.2; 165/39, 134, 47; 308/77; 219/201, 209, 306, 278, 296; 166/56, 62; 222/146 HE

[56] References Cited
UNITED STATES PATENTS

| | | |
|---|---|---|
| 1,475,389 | 11/1923 | Hyatt .................................. 415/178 |
| 1,700,840 | 2/1929 | Gay ..................................... 310/52 |
| 1,739,137 | 12/1929 | Gay ..................................... 310/52 |
| 2,004,777 | 6/1935 | Bassler ............................... 415/178 |
| 2,451,124 | 10/1948 | Smith .................................. 308/77 |
| 2,552,169 | 5/1951 | Graham ............................. 318/473 |
| 2,711,473 | 6/1955 | Mahaffy ............................. 219/296 |
| 2,738,409 | 3/1956 | Bowman ............................ 219/278 |
| 2,967,269 | 1/1961 | Vaughan ............................ 318/473 |
| 2,994,472 | 8/1961 | Botje .................................. 415/178 |
| 3,318,253 | 5/1967 | Campolong ......................... 310/64 |
| 3,395,644 | 8/1968 | Grebel ................................ 310/58 |
| 3,652,881 | 3/1972 | Albright .............................. 310/64 |
| 3,801,843 | 4/1974 | Corman ............................... 310/58 |

*Primary Examiner*—R. Skudy
*Attorney, Agent, or Firm*—Michael J. Striker

[57] ABSTRACT

A pump for circulating cooling and lubricating liquid is driven by a motor which comprises a central rotor; a tubular housing coaxially surrounding the rotor and normally filled by the cooling and lubricating liquid; and a stator coaxially surrounding this tubular housing. Heating elements are provided between the coil ends of the stator and the tubular housing for heating the liquid in this housing, during or after a shutdown of the motor, when the liquid is likely to have congealed or at least to have become viscous.

12 Claims, 3 Drawing Figures

APPARATUS FOR CIRCULATING COOLING AND LUBRICATING LIQUIDS AND THE LIKE PARTICULARLY AFTER SHUTDOWN OF THE APPARATUS

BACKGROUND OF THE INVENTION

The invention relates to a motor of the type having its rotor surrounded by a tubular housing and having this housing in turn surrounded by the stator. Such motors are used for driving a pump for circulating a liquid which must be hermetically sealed from the ambient, for example to prevent the liquid from creating dangers to safety and health, and which must also be protected from any contact with liquid-polluting elements such as common lubricating oil. It is usual in the circulating of such a liquid to use portions of the circulated liquid itself both as coolant and as lubricant for the motor driving the liquid circulating pump and for this purpose particularly to enclose the liquid and the rotor of the motor in a hermetically sealed system of enclosures or housings. The housing for the rotor of the pump actuating motor is sometimes called a gap tube, and is commonly as a tube providing a narrow, liquid filled gap between the rotor and the inside of the tube. The stator of the motor surrounds the tube and is sealed off thereby from contact with the liquid, to protect the stator and also the liquid.

Many of the liquid media and particularly many of the cooling and lubricating liquids circulated in systems of the indicated type tend to become viscous or even to congeal below certain temperatures, often including the common room or ambient temperature. In systems of this type, difficulties are encountered at the time of restarting the unit after a shutdown, because of the greatly increased torque which acts on the rotor as a result of the viscous or congealed condition of the liquid wherein the rotor is immersed. Attempts have therefore been made to liquefy congealed and viscous liquid in the rotor chamber, by application of heat at times between the periods of normal operation of the motor.

Small motors can be heated for such purposes by repeated starting and stopping of the motor, but this process is time consuming and is therefore not acceptable where the motor-pump unit is for example, a reserve unit, which must be started without delay. In the case of relatively large motors the repeated starting and stopping would also lead to structural damage and would be unacceptable for this reason.

Other attempts have therefore been made wherein an entire motor was heated from the outside preliminary to its restarting, for example by heating conduits wherein steam or hot water circulated, or by electric heating elements. This system is expensive since it must heat the entire mass of the motor in order to heat the relatively small mass of liquid in the gap tube.

Still another, rather theoretical possibility has been considered, in which an electric heating current is passed through the stator coils. This is another method which involves rather large cost. If direct current be passed through the stator for the indicated purpose, heating is effected only by the resistance of the stator coils; for this reason, high densities of current are needed which are all too expensive. If two-phase alternating currents are used for heating the motor through the coils, unproportionally large transformers are needed due to the resulting poor power factor. Another drawback of the method of heating by current passing through the stator coils is that too much of the generated heat is lost to the ambient, unless the entire motor be encased in an unwieldy and expensive heat-insulating casing.

Still another solution has been proposed: to feed specially heated liquid into the rotor space. This requires special valves and valve operations and corresponding expenses and losses of time. Therefore, this method is warranted at most at the time of first operation of a motor pump; it is not acceptable in other cases and mainly not in cases where the motor pump unit must be in readiness promptly, for example to operate instead of a disabled pump.

SUMMARY OF THE INVENTION

It is an object of the invention to overcome the difficulties encountered with earlier devices of the present type.

It is another object to provide an improved arrangement for heating a gap tube motor during or after periods of shutdown.

It is a further object to provide a shutdown heating arrangement for gap tube motors which insures rapid resumption of operation.

Still another object is to provide such an arrangement which avoids unnecessary heat losses.

The objects are achieved by providing heat elements on the gap tube of a gap tube motor for heating the liquid in the gap tube. In particular, two heating elements are provided, on spaced portions of the gap tube surrounded by the coil ends of the motor stator.

It is a fundamental advantage of the new arrangement that the effect of the heating means is applied efficiently, directly and substantially without loss to the liquid in the gap tube, around the rotor. The expenditure required for electric current or other media to operate the heating elements is quite small compared with the expenditure required in earlier heating arrangements employed during or after a period of shutting down a gap tube motor, which arrangements applied large parts of the heating effects to the stator coils or to the entire motor. At the same time, the new heater elements are located favorably within the motor so as not to interfere with required repairs. The elements are free of any problem of leakage of the circulation liquid.

It is preferred to have the new heaters supported by a support tube which surrounds the gap tube. It is possible for this purpose to embed the heating ducts in heat-conductive cement, supported by the support tube and surrounding the latter. In particular it is preferred to use a heating sleeve, known by itself, and to arrange it on the aforementioned support tube. Control elements can also be arranged on or in the support tube; for example, the support tube may carry a thermostat sensor in contact with the gap tube. In addition, a temperature limiting device can be provided in contact with the heating elements and with the motor coils. The latter arrangements, allowed by the new gap tube heating arrangement, provide for and simplify the regulation of the desired liquid temperature, and also provide for and simplify a control which protects the heating elements and the motor coils against excessive temperatures. The thermostat and temperature limiting elements can be provided advantageously by negative temperature control or positive temperature control sensors, respectively.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
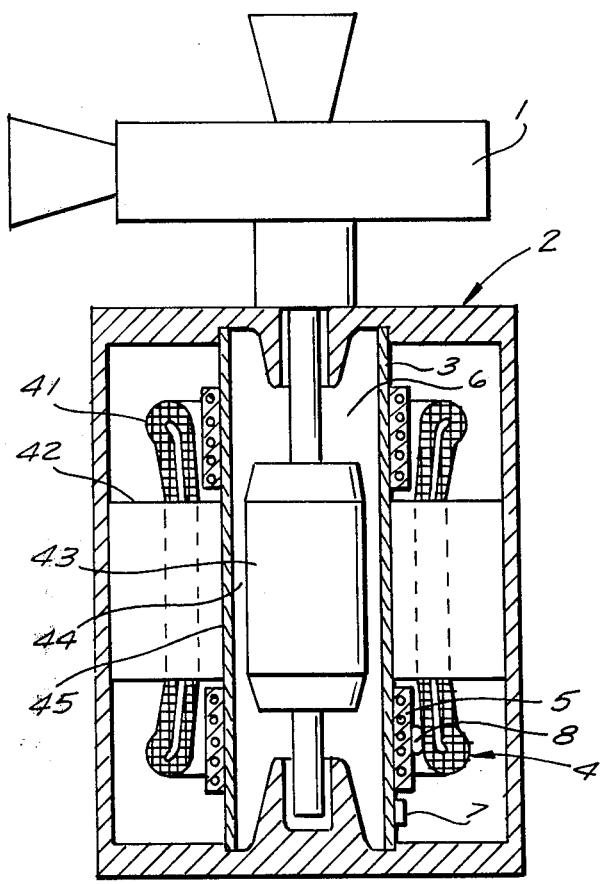
FIG. 1 is an elevational view, partly in central vertical section, of an embodiment of the invention.

As shown in FIG. 1, pump 1 is driven by a gap tube motor 2 comprising a gap tube 3 with a stator 4 mounted upon and around it. The invention provides heating means 5 mounted on and around the gap tube 3, for heating the liquid which fills the space 6 in gap tube 3. As particularly shown, two axially spaced elements 5 — one at each end of stator 4— are provided. They are in contact and in close heat-transfer relation with the gap tube 3 which they surround, whereas they are not only surrounded by but spaced from coil ends 41 of stator 4 and accordingly not in close heat-transfer relationship with the coil ends 41. The coil ends 41 are mounted on stator core 42, for rotating a central rotor 43, which may be of the squirrel cage type.

In operation, pump 1 circulates liquid coolant, lubricant or any other liquid to be sealed from contact with external parts such as stator 4. Portions of this liquid enter the gap tube 3 and fill the same around the rotor 43. The heat generated by the operation of motor 2 is absorbed by this liquid, which accordingly serves as coolant for this motor. The liquid also lubricates the bearings of rotor 43. In normal operation, liquid in the space 6 is heated by the heat generated during operation of the motor. In addition, the liquid circulated by pump 1 in many applications also carries heat from an evaporator (not shown) through a vapor condenser (not shown) whereby it is heated before it enters liquid filled space 6 in motor 2.

During shutdown periods of the motor pump unit 1, 2 these heating effects are lacking and liquid in the space 6 tends to become quite cold, as heat is transferred from it through the stator 4 and the housing of motor 2 to the surrounding atmosphere. Due to these effects, the liquid tends to become viscous, or to congeal around rotor 43. When it is then desired to resume rotation of this rotor by normal energization of stator coils 41, the viscous or congealed liquid 6 imposes an increased torque on rotor 43, whereby resumed rotation of this rotor either becomes impossible or at least is delayed.

According to the invention, this difficulty is counteracted by operating heating elements 5, either during the shutdown period of motor-pump unit 1, 2 or at least at the time when operation of the motor 2 is to be resumed. The heating means according to the invention applies heating energy directly and efficiently to the material to be heated: the liquid in gap tube 3 and in gap 44 between rotor 43 and the inner ends 45 of stator 4. Therefore the heating effect, generated by the new heating elements 5, is needed only very briefly, and it is unnecessary to apply excessive temperatures in or by the heating elements 5, and thereby to endanger either these heating elements themselves, or other motor elements, particularly stator 4.

In order to avoid excessive heating while applying heating effects to liquid in space 6 which are adequate to raise the temperature of this liquid rapidly, it is preferred to incorporate thermostat means 7 and also temperature limiting means 8.

Figure 2:
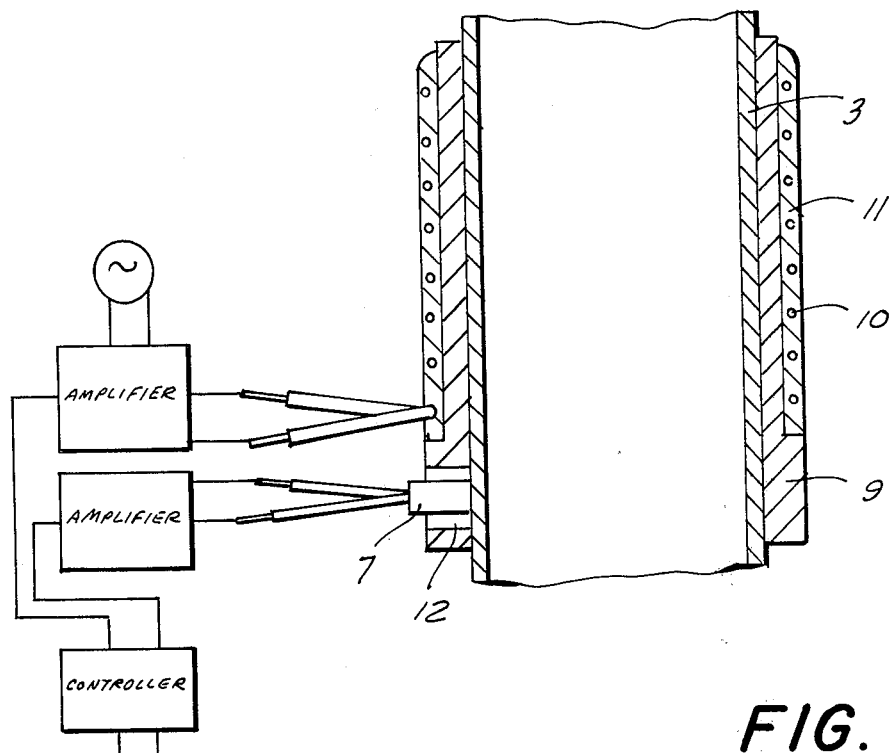
FIG. 2 shows a detail from FIG. 1 on a larger scale and in slightly modified form, together with a block diagram of control elements provided for the same.

The thermostat means 7 may comprise sensor material of negative temperature control type, on gap tube 3 and in contact and close heat-transfer relationship therewith, for producing a signal which is suitably amplified, as indicated in FIG. 2, for controlling gap-tube heater 10 and/or stator 4. The temperature-limiting means 8 are in local contact with heating element 5 on the one hand, and with coil ends 41 on the other hand, and may comprise sensor material of positive temperature control type.

As also shown in FIG. 2, gap tube 3 is surrounded by a metallic support tube 9 in contact therewith. Tube 9, in turn, is surrounded by and in contact with a heater comprising electric heating wires 10 embedded in electrically insulating but thermally conductive cement 11. Adjacent one end of heating elements 10, 11 thermostat sensor 7, surrounded by insulating means 12, is carried by an end collar of the support tube 9 and held in close contact with gap tube 3.

Figure 3:
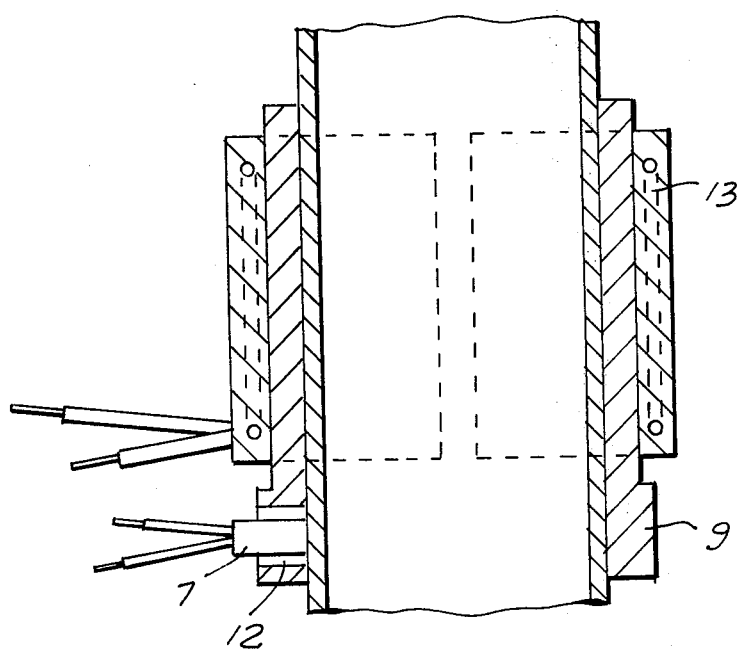
FIG. 3 is a further detail from FIG. 1 showing a further slight modification of the structure.

FIG. 3 shows a modification in which the electric heating wires are embedded in heater sleeve 13, known by itself and which may, as shown, embrace the support tube 9.

It will be understood that each of the elements described above, or two or more together, may also find a useful application in other types of gap tube motors differing from the types described above.

While the invention has been illustrated and described as embodied in a gap tube motor, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features which, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

I claim:

1. An electromotor having associated therewith a pump driven thereby and arranged to circulate around the rotor of the electromotor a cooling and lubricating liquid which becomes viscous below certain temperatures, comprising a tubular housing substantially coaxial with and surrounding said rotor to form therearound a chamber communicating with said pump; a stator surrounding said tubular housing and separated from said rotor thereby; heating means disposed in spaced relationship from the coil ends of said stator and located around said tubular housing in close heat relationship therewith, whereby said heating means is substantially unaffected by the thermal conditions developing on said coil ends and is operable to decongeal the cooling and lubricating liquid in said chamber; and a temperature sensing means mounted in close heat transfer relationship with said tubular housing and adapted to monitor and signal the temperature of the cooling and lubricating liquid inside said tubular housing.

2. An electromotor as defined in claim 1, wherein said heating means comprises two heating units mutually spaced in axial direction and each positioned at one end of said tubular housing.

3. An electromotor as defined in claim 2, comprising a tubular support surrounding said tubular housing and supporting said heating means in heat transfer relationship with said tubular housing.

4. An electromotor as defined in claim 3, comprising a heating sleeve incorporating said heating means and embracing said tubular support.

5. An electromotor as defined in claim 1, comprising a body of heat conductive cement disposed around, and in heat transfer relationship with, said tubular housing and embedding said heating means.

6. An electromotor having associated therewith a pump driven thereby and arranged to circulate around the rotor of the electromotor a cooling and lubricating liquid which becomes viscous below certain temperatures, comprising a tubular housing substantially coaxial with and surrounding said rotor to form therearound a chamber communicating with said pump; a stator surrounding said tubular housing and separated from said rotor thereby; heating means disposed in spaced relationship from the coil ends of said stator and located around said tubular housing in close heat relationship therewith, whereby said heating means is substantially unaffected by the thermal conditions developing on said coil ends and is operable to decongeal the cooling and lubricating liquid in said chamber; a temperature sensing means in heat transfer contact with said tubular housing and arranged to monitor the temperature inside said chamber and to produce signals representative of said temperature; and control means connected to said temperature sensing means and arranged to respond to said signals and energize or deenergize said heating means in dependence upon the temperature of the cooling and lubricating liquid inside said chamber.

7. In a motor-pump unit of the type used for circulating a liquid which becomes viscous below certain temperatures, a combination, comprising a gap tube motor having a central rotor; a tubular housing surrounding said rotor and normally filled with pumped liquid; a stator surrounding said tubular housing; heating means also surrounding said tubular housing and being in close heat-transfer relation with the latter, for decongealing the liquid in said tubular housing; thermostatic sensing means mounted in close heat-transfer relationship to said tubular housing; and means for controlling said heating means cooperating with said thermostatic sensing means.

8. In a motor-pump unit of the type used for circulating a liquid which becomes viscous below certain temperatures, a combination, comprising a gap tube motor having a central rotor; a tubular housing surrounding said rotor and normally filled with pumped liquid; a stator surrounding said tubular housing; heating means also surrounding said tubular housing and being in close heat-transfer relation with the latter, for decongealing the liquid in said tubular housing; temperature limiting means mounted in contact with said heating means; and means for regulating said heating means in dependence upon the temperature of said limiting means.

9. In a motor-pump unit of the type used for circulating a liquid which becomes viscous below certain temperatures, a combination comprising a gap tube motor having a central rotor; a tubular housing surrounding said rotor and normally filled with pumped liquid; a stator having coil ends surrounding said tubular housing; heating means having two heating elements axially spaced apart and disposed at opposite ends of said stator, said coil ends surrounding said heating elements but spaced therefrom, said heating elements also surrounding said tubular housing and being in close heat transfer relation with the latter for heating the liquid in said tubular housing; and temperature limiting means in local contact with said heating means and with said coil ends.

10. In a motor-pump unit of the type used for circulating a liquid which becomes viscous below certain temperatures, a combination comprising a gap tube motor having a central rotor; a tubular housing surrounding said rotor and normally filled with pumped liquid; a stator surrounding said tubular housing; heating means also surrounding said tubular housing and being in close heat transfer relation with the latter for heating the liquid in said tubular housing; thermostatic sensing means having a sensor of negative temperature controlling type mounted in close heat transfer relationship to said tubular housing; and means for controlling said heating means cooperating with said thermostatic sensing means.

11. In a motor-pump unit of the type used for circulating a liquid which becomes viscous below certain temperatures, a combination comprising a gap tube motor having a central rotor; a tubular housing surrounding said rotor and normally filled with pumped liquid; a stator surrounding said tubular housing; heating means also surrounding said tubular housing and being in close heat transfer relation with the latter for heating the liquid in said tubular housing; thermostatic sensing means mounted in close heat transfer relationship to said tubular housing; a tube supporting said heating means, said tube also supporting said thermostatic sensing means and holding it in close heat transfer relation with said tubular housing; and means for controlling said heating means cooperating with said thermostatic sensing means.

12. In a motor-pump unit of the type used for circulating a liquid which becomes viscous below certain temperatures, a combination comprising a gap tube motor having a central rotor; a tubular housing surrounding said rotor and normally filled with pumped liquid; a stator surrounding said tubular housing; heating means also surrounding said tubular housing and being in close heat transfer relation with the latter for heating the liquid in said tubular housing; temperature limiting means mounted in contact with said heating means, said temperature limiting means comprising a sensor of positive temperature controlling type; and means for regulating said heating means in dependence upon the temperature of said limiting means.

* * * * *